United States Patent [19]

Tatard

[11] 4,220,576

[45] Sep. 2, 1980

[54] PRODUCTS BASED ON PLASTER AND PROCESSES FOR THEIR MANUFACTURE

[75] Inventor: François Tatard, Rennes, France

[73] Assignee: Societe d'Investissement pour le Developpement des Appareils Menagers, Montrouge, France

[21] Appl. No.: 927,936

[22] Filed: Jul. 25, 1978

[30] Foreign Application Priority Data

Jul. 26, 1977 [FR] France .............................. 77 22934

[51] Int. Cl.$^2$ ............................................ C08L 61/28
[52] U.S. Cl. ............................... 260/29.4 R; 106/116; 260/15; 264/176 R; 264/331; 525/157; 528/254; 528/259
[58] Field of Search ................... 260/29.4 R; 106/116, 106/111; 264/176 R, 328, 331; 528/254, 259

[56] References Cited

U.S. PATENT DOCUMENTS

| | | | |
|---|---|---|---|
| 2,966,473 | 12/1960 | Biefeld et al. | 260/29.4 R |
| 3,748,290 | 7/1973 | Reingen | 260/29.4 R |
| 3,852,083 | 12/1974 | Yang | 106/116 |

FOREIGN PATENT DOCUMENTS

1322896  7/1973  United Kingdom.
1479804  7/1977  United Kingdom.

Primary Examiner—Theodore E. Pertilla
Attorney, Agent, or Firm—Larson, Taylor and Hinds

[57] ABSTRACT

The process for the manufacture of a plaster product comprises adding a urea-formol or melamine-formol resin to a calcium sulphate base powder, the starting powder being constituted by partially hydrated calcium sulphate (plaster alone or with gypsum, or anhydrite with gypsum such as phosphogypsum). The percentage of resin, measured in weight of dry extract of the latter with respect to the weight of the dry extract of the powder to which it is added, is comprised between 1 and 5%. A powder-resin-water mixture is formed by a process of extrusion. The product thus formed is heated to a temperature comprised between 105° and 120° C. Articles having exceptional surface hardness and durability can be formed therefrom by a continuous extrusion.

11 Claims, No Drawings

PRODUCTS BASED ON PLASTER AND PROCESSES FOR THEIR MANUFACTURE

BACKGROUND OF THE INVENTION

1. Field of the Invention

The invention relates to articles or products based on calcium sulphate and processes for their manufacture.

2. Description of the Prior Art

Plaster, or almost anhydrous calcium sulphate, is generally prepared by the calcination of gypsum, or hydrated calcium sulphate.

To then obtain a plaster product, water is added to the latter until a plastic paste is obtained.

This paste is then rapidly shaped since setting, which confers successively on this paste a granular condition and then a solid condition, is very rapid: the period for which said paste preserves a plastic behavior lending itself to molding or forming under pressure (notably by extrusion, by injection . . . ) is too short to be exploitable in practice.

To slow down this setting, it has already been proposed to add to the pasty plaster-water mixture various adjuvants which retard the setting, constituted notably by phosphates, nitrates, urates, certain sulphates and in particular urea.

Unfortunately, the presence of such adjuvants has the following drawbacks:

it does not improve in any way the plasticity of the paste, it exerts an inhibiting role with respect to the subsequent crystallization of the plaster, so that it would be necessary to remove the adjuvants later by means of special treatments if it is desired to obtain finally a product hardened homogeneously throughout its mass.

It is a particular object of the invention to overcome these drawbacks by improving the plasticity and the behavior of the calcium sulphate base paste at the same time as the slowness of its setting to the point of making possible molding or forming under pressure, notably by extrusion, of said paste, and this without creating any difficulty in subsequent crystallization.

It is another object of the invention to enable the constitution in part of the starting powder mixture by gypsum and more particularly by phosphogypsum, without necessitating either calcination, or drying, or prior grinding of this latter material.

At this point of the description it should be specified that it has already been proposed to add to a gypsum-water mixture, a urea-formol or melamine-formol resin in the proportion of a weight percentage of the resin always higher than 10%, preferably than 20%, in the mixture: this very high percentage does not permit the above problems to be resolved, by reason notably of the inhibiting effects which result therefrom which respect to the crystallization of the calcium sulphate.

It should be specified in addition that, if the calcium sulphate is exclusively in its hydrated gypsum form in the starting mixture, it is not possible to ensure the subsequent crystallization of this sulphate under good conditions, since the latter involves partial dehydration of said sulphate: in particular it is necessary to resort for this purpose to very high pressures, which are prohibited in practice.

It is an object of the invention to overcome these drawbacks.

GENERAL DESCRIPTION OF THE INVENTION

According to the invention, there is still added to a calcium sulphate powder, water and urea-formol or melamine-formol resin, but for this calcium sulphate a partially hydrated form is selected (plaster alone or with gypsum, or anhydrite, that is to say anhydrous calcium sulphate, with gypsum), and for the percentage of resin, taking into account the weight of dry extract of the sulphate powder to which it is added, a value comprised between only 1 and 5%, then the powder-resin-water mixture obtained is formed by a process, such as extrusion, applying slight compression, and the product thus formed is taken to a temperature comprised between 105° and 120° C.

DESCRIPTION OF PREFERRED EMBODIMENTS

The preferred embodiments of the process according to the invention will now be described, resorting in addition to one and/or the other of the following features:

the weight of the gypsum in the starting powder is comprised between 3 and 5 times that of the plaster or anhydrite, the resin is supplemented by a substantially equal amount by weight of acetone, the acidity of the mixture is adjusted to a pH of the order of 2 to 5.

The invention also relates to the pastes applied in the above-defined processes, as well as to the "plaster" products obtained.

In the following description, of course, the several preferred embodiments of the invention are not to be taken as limiting.

The process is commenced by mixing intimately in a suitable mixer so as to form a homogeneous powder of the plaster alone or with gypsum or anhydrite with gypsum in the ratio of a weight proportion preferably as a majority of gypsum in the mixture, the weight of the latter constituent being notably comprised between 3 and 5 times that of the plaster or anhydrite.

As gypsum it is particularly advantageous to use a "phosphogypsum", that is to say a material which at present constitutes a waste material without utility from certain processes for manufacture of phosphoric acid and phosphate fertilizers, and this without there being any necessity to proceed by a prior calcination or drying phase of this gypsum to convert it to plaster.

To the above powder is added mixing water supplemented with a urea-formol or melamine-formol resin or a derivative of such a resin.

The percentage by weight of mixing water added to the powder is comprised between 15 and 75% of the weight of this powder.

The percentage by weight of the resin or the like, usually available in the form of an "emulsion" or aqueous solution, is comprised between 1 and 5% by weight of dry extract with respect to the weight of dry minerals in the starting powder.

According to the particular case, there may be added to the mixing solution concerned in order to improve its delaying function and/or its plasticizing function as well as if necessary the properties of the finished product:

acetone in an amount by weight substantially equal to that of the resin, a lignosulphonate in the ratio of a weight percentage in the order of 1 to 5 per thousand of the weight of water, small amounts of acrylic, vinyl, cellulosic, ABS resin
. . .

The acidity of the mixture is desirably regulated to the vicinity of a pH of 2 to 5, for which if necessary an addition of sulphuric acid or, better still, of ammonium sulphate, may be made.

The mixture of powder and aqueous solution thus defined is malaxated so as to be in the form of a homogeneous paste.

It is observed that the latter has excellent and lasting properties of plasticity.

It is this paste that is molded by a process which can apply slight pressure (less than 20 bars), such as extrusion through a die or injection into a mold.

Immediately after this molding, the product obtained is unmolded if necessary, after which it is dried, notably by storing in a dry atmosphere for some 12 hours.

This drying enables a large percentage of the excess water present in the paste in the course of the molding to be removed, said water not being used for subsequent crystallization.

The thus partly dried product is then brought to a temperature comprised between 105° and 120° C., which ensures the completion of the drying, the crystallization of the calcium sulphate and the polymerization of the resin.

This polymerization of the resin—which is ensured by the conjoint effect of temperature and acidity of the medium—is manifested by the condensation of this resin.

In the course of this condensation, the retarding effect molecule (urea or melamine) which is initially partly combined with the formol molecule remains bonded to the latter in the midst of a stable macromolecule.

This macromolecule has the property of being inert with respect to the calcium sulphate.

In other words, the fraction of the adjuvant adopted with a delaying effect is automatically neutralized when this delaying effect is no longer sought and must on the other hand be avoided, so that said fraction does not hinder in any way the crystallization which is then desired of the calcium sulphate.

The other components of the mixing liquid (acetone . . . ) are removed simply by evaporation during drying and subsequent heating of the plaster product.

The hard product obtained after cooling has, among other properties, a surface layer or skin which is remarkably dense and hard.

This skin is due to the fact that, in the compression molding phase, the presence of the above resin favors migration of the finest components, including said resin and mixing water, to the outer surface of the product in the course of molding.

This "skin" is particularly manifest in the case of thin articles or hollow articles with relatively thin walls (5 to 20 mm thickness).

It appears to be particularly advantageous in that it ensures sound mechanical behavior of the articles concerned, in that it confers on them an attractive appearance (smooth surface, clean contours and edges) and in that it favors the durability of paints and surface coatings, although the porosity of plasters generally results in absorption of these surface coatings in the liquid state.

It should be noted that the presence of the urea-formol macromolecules or the like in the hard product obtained can be detected by certain methods of analysis, notably chemical.

Consequently, whatever the embodiment adopted, there is finally provided a method of manufacturing plaster articles having numerous advantages with respect to those hitherto known, in particular as regards:

the possibility of forming these articles by a process involving slight pressure, and in particular continuous production by extrusion, the quality of the products obtained, in particular as regards the density and hardness of their surface layers, and the possibility of using a prior calcination of the gypsums and in particular of phosphogypsums.

As is self-evident and as it emerges already from the foregoing, the invention is in no way limited to those of its types of applications and embodiments which have been more especially envisaged; it encompasses, on the contrary, all modifications.

I claim:

1. A method of manufacture of a calcium sulfate-based product comprising: admixing water, a resin selected from the group consisting of urea-formol resin and melamine-formol resin, and a calcium sulfate powder to form a paste, said powder comprising gypsum and plaster, said gypsum constituting a major portion of said calcium sulfate powder, the amount of said resin being from 1 to 5% based on the weight of said powder; shaping the paste under slight pressure; and heating the shaped material at a temperature of from 105° to 120° C.

2. A method according to claim 1 wherein said shaping comprises extruding the paste through a die.

3. A method according to claim 1 wherein the weight of gypsum in the paste is from three to five times the weight of said plaster.

4. A method according to claim 1 wherein the paste further comprises acetone in an amount by weight substantially equal to that of said resin.

5. A method according to claim 1 wherein the paste has a pH on the order of 2 to 5.

6. A paste for the manufacture of a calcium sulfate-based product comprising an intimate admixture having a pH of 2 to 5 and comprising water, a resin selected from the group consisting of urea-formol resin and melamine formol resin, and a calcium sulfate powder, said powder comprising gypsum and plaster, said gypsum constituting a major portion of said calcium sulfate powder, the amount of said resin being from 1 to 5% based on the weight of said powder.

7. A paste according to claim 6 wherein the weight of gypsum in the paste is from three to five times the weight of said plaster.

8. A paste according to claim 6 wherein the paste further comprises acetone in an amount by weight substantially equal to that of said resin.

9. A paste according to claim 6 wherein the paste comprises from 15 to 75% water based on the weight of said powder.

10. A plaster product produced by the process of claim 1.

11. A plaster product according to claim 10 comprising inert macromolecules of urea formol resin or melamine formol resin in a mass of crystalline calcium sulfate.

* * * * *